United States Patent [19]

Herchenröder

[11] 3,965,682
[45] June 29, 1976

[54] HYDRAULIC INSTALLATION, MORE PARTICULARLY FOR DRIVING WARPING RETAINING WINCHES ON BULK CARGO SHIPS

[75] Inventor: Hans Herchenröder, Varrelgraben, Germany

[73] Assignee: Friedrich Kocks GmbH, Bremen, Germany

[22] Filed: July 2, 1974

[21] Appl. No.: 485,685

[30] Foreign Application Priority Data
July 20, 1973 Germany............................ 2336897

[52] U.S. Cl................................... 60/420; 60/450; 60/484; 91/506
[51] Int. Cl.².......................................... F16D 31/02
[58] Field of Search................... 91/504, 505, 418; 92/12.1, 12.2; 60/465, 460, 487, 459, 382, 433, 434, 494, 450, 420, 484; 180/6.3, 6.48; 254/186

[56] References Cited
UNITED STATES PATENTS

| | | |
|---|---|---|
| 2,255,783 | 9/1941 | Kendrick .......................... 60/450 |
| 3,579,978 | 5/1971 | Stams ............................... 60/433 |
| 3,648,567 | 3/1972 | Clark ................................ 91/505 |
| 3,680,313 | 8/1972 | Brundage .......................... 60/460 |
| 3,834,281 | 9/1974 | Heyl ................................. 91/506 |
| 3,874,173 | 4/1975 | Wilkins ............................. 60/420 |

Primary Examiner—William L. Freeh
Assistant Examiner—G. P. LaPointe
Attorney, Agent, or Firm—Sughrue, Rothwell, Mion, Zinn & Macpeak

[57] ABSTRACT

An hydraulic system is disclosed for driving a plurality of hydraulic power units, such as warping and retaining winches on ships, each connected to an hydraulic supply network with a constant network pressure. Each hydraulic power unit is adjustable for torque output and a volume regulating device controls the amount of hydraulic fluid supplied to each unit. The torque adjustment and the volume regulation are interconnected to simultaneously control both operating parameters.

20 Claims, 12 Drawing Figures

HYDRAULIC INSTALLATION, MORE PARTICULARLY FOR DRIVING WARPING RETAINING WINCHES ON BULK CARGO SHIPS

BACKGROUND OF THE INVENTION

The invention relates to a hydraulic installation for driving preferably a number of units, more particularly warping and retaining winches on ships, each of which is driven by a hydraulic adjusting motor (a hydraulic motor with a variable absorption volume) connected to a hydraulic network with constant network pressure.

The invention relates mainly to the remote activation of hydraulic winches, more particularly warping and retaining winches, which are used in places subject to explosions, for instance, on liquid or dry bulk cargo ships and on container ships. Basically the invention is also suitable for driving individual installation, for instance, winches. In remote activation of hydraulic winches in this way it is known to use hydraulic regulating motors (adjusting motors). The basic problem is that hydraulic adjusting motors fed at a constant network pressure run the risk of overspeeding. In the known hydraulic installation with adjusting motor and constant network pressure the hydraulic motor is prevented from speeding up to the point of destruction by a torque converter being connected downstream to the hydraulic motor. The characteristic of the torque converter results in a torque always being "forced on to" the hydraulic motor and preventing it from overspeeding.

SUMMARY OF THE INVENTION

It is an object of the invention to provide a novel hydraulic installation for the remote activation more particularly of winches, which is simpler in construction and handling and reliable for all loading conditions.

To this end according to the invention, disposed in the forward branch and/or the return branch of the adjusting motor is a volume controller, the volume controller and the adjusting motor being adjusted in dependence on one another.

The invention is based on the knowledge that the overspeeding of a hydraulic adjusting motor fed with constant network pressure can be prevented by a volume regulator — i.e., an apparatus which regulates the flow volume independently of the pressure — connected upstream of the motor, more particularly in its forward line extending from the network — i.e., in a part of the hydraulic network which is associated only with the motor in question, so long as the opening position of the volume regulator is adjusted in dependence on, more particularly, jointly with the hydraulic motor. The dependence of the adjustment of the motor and the volume regulator can vary as required, in dependence on the desired characteristics of the installation. The zero position of the installation is preferably determined by the closed position of the volume regulator. A fixed zero position is therefore ensured. The dependence between the position of the adjusting motor (the position of its swash plate) and the opening position of the volume regulator can, for instance, be so selected that the volume regulator has reached its full opening when the associated position of the hydraulic motor produces a torque corresponding to about 33% of the maximum torque. The volume regulator can also be disposed in the return line returning from the motor to the network.

The installation according to the invention is preferably used to drive jointly two or more units, more particularly winches, with each of which an adjustable hydraulic motor is associated. The hydraulic motors can be driven separately, that is to say independently of the loading and speed of the other hydraulic motors in the installation.

The dependent adjustment of the hydraulic motor and volume regulator can be performed in various manners. Basically two methods are involved, in one the hydraulic motor and the volume regulator are adjusted by a common actuating member which acts via adjusting members producing different movements on the hydraulic motor and the volume regulator. The adjusting members, which are acted upon by the common actuating member, can be mechanical and/or hydraulic members.

The other method is to adjust the volume regulator and use the resulting change therein to adjust the hydraulic motor. Conveniently, hydraulic adjusting members can be used which respond to adjustments of the volume regulator and resulting changes in the hydraulic system. The last mentioned method has the advantage that the hydraulic energy supplied is completely converted into work, in dependence on the operating condition, and is suitably throttled at lower loads. Moreover, this method allows particularly sensitive operation and has the advantage of favorable startingup characteristics and is less inclined to hydraulic upward jumps.

Other preferred features of the invention relate to the construction of the hydraulic and mechanical adjusting members and the adjusting members for transmitting the dependent adjusting movements, and also to suggestions for improving the characteristic of the volume regulator.

DETAILED DESCRIPTION OF THE DRAWINGS

Embodiments of the invention will now be described in greater detail with reference to the drawings, wherein.

DETAILED DESCRIPTION OF THE INVENTION

Figure 1:
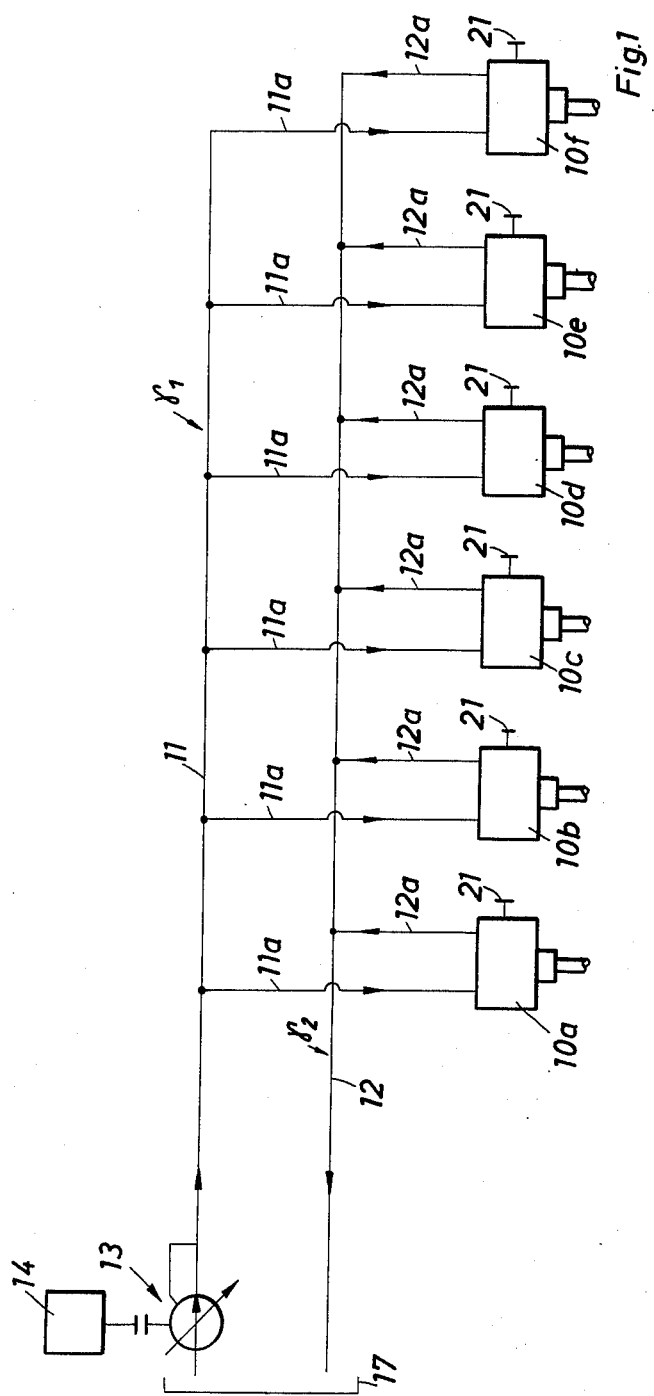
FIG. 1 shows diagrammatically a hydraulic installation according to the invention with a number of loads on a common pump.

The invention is mainly and preferably used in hydraulic installations with a number of remote activated units, more particularly warping and retaining winches. Of the driven units, FIG. 1 shows merely diagrammatically the control and drive units 10a–10f, some of which are also diagrammatically illustrated in the other drawings, and with which winches are associated on the output side. The structure of the control and drive units 10a–10f, etc., can be gathered from the following explanations in conjunction with the drawings.

The control and drive units are fed from a common hydraulic network with a forward line 11 and a return line 12. The control and drive units 10a, etc., are each connected in parallel to the hydraulic network via a forward branch 11a and a return branch 12a.

A constant pressure, preferably a high pressure of about 200 atm, is produced in the hydraulic network, namely in the forward line 11, by a common regulating pump 13 driven by a motor, for instance, an electric motor 14. In dependence on changes in pressure in the forward line 11, the regulating pump 13 so delivers that a constant pressure $p_1$ is always maintained in the forward line 11, independently of the loading of the network. A pressure $p_2$ is in the return line 12, which in this case extends to a common oil tank 17. The hydraulic network can also be constructed in the form of a closed circuit system.

Figure 2:
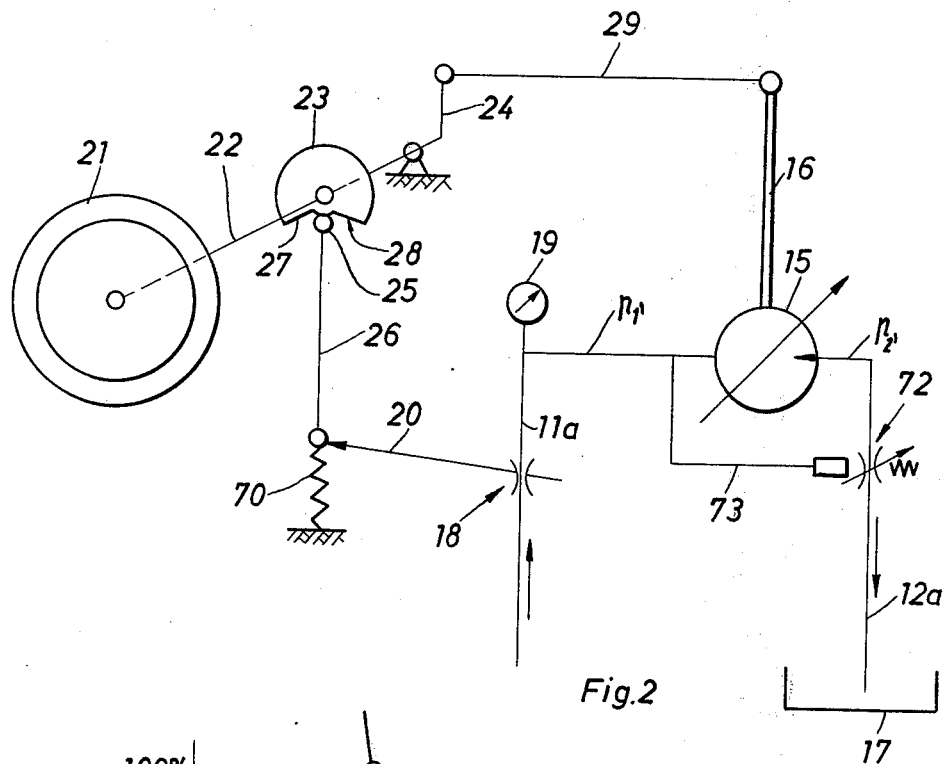
FIG. 2 shows diagrammatically an embodiment of the control and drive section associated with a winch.

FIG. 2 shows diagrammatically an embodiment of one of the control and drive units 10a, 10b, etc.

Each of the control and drive units has a hydraulic adjusting motor 15. These are known, commercially available hydraulic regulating motors of variable absorption volume. Preferably, the invention uses a hydraulic adjusting motor with a swash plate whose inclined position is adjusted to change the torque. Lever arm 16, shown in FIG. 2 (and in the corresponding drawings), is used to adjust the swash plate.

The special feature is that one of the lines 11a, 12a associated with the individual adjusting motors 15 contains a volume regulator 18 of suitable known construction, for instance, taking the form of a volume regulating valve or flow regulating valve. The volume regulator 18 is so designed that the flow volume adjuster remains constant independently of the pressure $p_1$ or $p_2$. A manometer 19 is provided to determine the pressure $p_1$ or $p_2$ in the lines 11a or 12a. A pivotable regulator arm 20, shown diagrammatically, is used to adjust the volume regulator 18.

Figure 3:
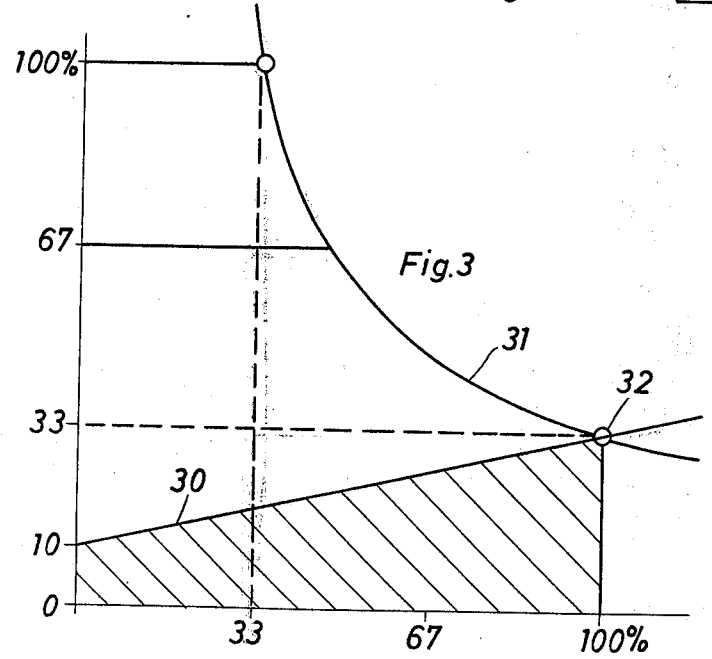
FIG. 3 shows a graph of the characteristic of the installation illustrated in FIG. 2.
Figure 4:
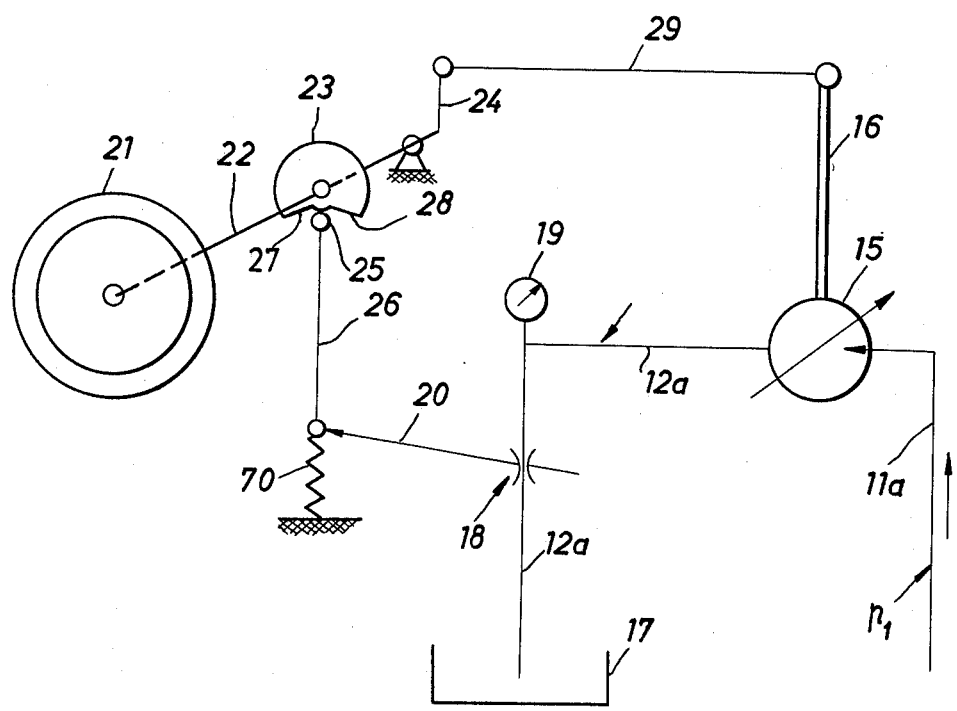
FIG. 4 shows a control and drive section with a volume regulator disposed in the return line.

The adjusting motor 15 and the volume regulator 18 are adjusted in dependence on one another, and also jointly in the embodiments illustrated in FIGS. 2 and 4. A predetermined position of the adjusting motor 15 and its swash plate therefore corresponds to a predetermined opening position of the volume regulator 18. In these embodiments the ratios can be such, as shown in FIG. 3, for instance, that when the volume regulator 18 is fully opened, the swash plate of the adjusting motor 15 has reached a position corresponding to 33% of its maximum torque.

Common adjustment is in this case performed in a simplified manner by a common member taking the form of a shaft 22 rotatable by a handwheel 21.

The adjusting members associated with the volume controller 18 and the adjusting motor 15 comprise in the examples illustrated in FIGS. 2 and 4 a specially constructed cam disc 23 and a crank arm 24, both of which are disposed on the shaft 22.

The cam disc 23, which, for instance, acts on the regulator arm 20 under spring loading via a thrust rod 26 having a roller 25, is so constructed that the smallest radius of the zone of the cam disc 23 scanned by the roller 25 corresponds to the closure position of the volume regulator 18. The outer periphery of the cam disc 23 produces the opening position of the volume regulator 18 loaded by a spring 70 in the direction of the closure position. The intermediate inclined transitional zones 27, 28 produce different opening positions of the volume controller 18, for different directions of rotation of the adjusting motor.

Due to the disposition of the crank arm 24 and the cam disc 23 on the common shaft 22, such members are always adjusted in common by the same angular amount. The crank arm 24 is connected to the lever arm 16 of the adjusting motor 15 via a thrust rod 29.

The control and drive units illustrated in FIGS. 2 and 4 operate as follows: due to the construction of the cam disc 23, at the start of the movements out of the position shown in FIG. 2, first the lever arm 16 of the adjusting motor 15 is pivoted, with the volume regulator 18 still closed. The volume regulator starts to open only when the roller 25 of the thrust rod 26 runs on to one or other of the transistional zones 27, 28 of the cam disc 23. As a result the adjusting motor 15 is prevented from overspeeding when starting up. The adjusting motor 15 can start only at the start and increase of the opening of the volume regulator 18.

FIG. 3 shows a curve of the adjusting motor 15 for the control and drive units illustrated in FIGS. 2 and 4.

The graph shows the opening curve 30 of the volume regulator 18 and the output curve 31 of the adjusting motor 15. Due to the opening of the volume regulator 18 being delayed during starting up, at the instant the volume regulator 18 opens, there is already on the adjusting motor 15 a torque reproduced by the start of the opening line 30. The ratios are so selected that when the volume regulator 18 is completely open, 33% of the possible torque has been reached on the adjusting motor 15. The end point 32 of the opening line 30 shows the position in which the roller 25 has reached the outer periphery of the cam disc 23. Further adjustment of the handwheel 21 then merely pivots the lever arm 16 and therefore further alters the swash plate of the adjusting motor 15. The torque on the adjusting motor 15 can rise up to the maximum possible torque (100%) accompanied by a corresponding reduction in speed, so that the maximum torque is reached at 33% of the maximum speed.

The graph shows that when the volume regulator 18 has been completely opened, the adjusting motor 15 is adjusted directly, without being influenced by the volume control 18.

In this zone the motor runs with optimum power utilization without throttling, as long as the illustrated torque on the adjusting motor 15 corresponds to the actual loading force, and the oil flows away unpressurized in the return branch 12a. This condition is shown on the manometer 19 in the embodiment illustrated in FIG. 4. In the zone of the opening and closing phase of the volume regulator 18, shown in FIG. 3 by the hatched area, the volume regulator 18 acts as a throttle. In that phase in the embodiment illustrated in FIG. 4 a pressure $p_2$ is built up in the return branch 12a which can be read off the manometer 19.

The embodiments illustrated in FIGS. 2 and 4 differ from one another mainly by the arrangement of the volume regulator 18.

In the preferred embodiment illustrated in FIG. 2 the volume regulator 18 is disposed in the forward branch 11a of the adjusting motor 15. In this embodiment a manometer 19 is disposed in the forward branch 11a downstream of the volume regulator 18. The constant network pressure $p_1$ prevails in the flow direction upstream of the volume regulator 18. In the zone between the volume regulator 18 and the adjusting motor 15 a pressure $p_1'$ builds up. With this arrangement a pressure $p_2'$ is produced in the return branch 12a. It has been found that the motor is more favorably stressed with the volume regulator 18 disposed upstream of the adjusting motor than is the case with the embodiment illustrated in FIG. 4.

In the case of the arrangement illustrated in FIG. 2, a generator brake valve 72 is disposed in the return branch 12a to deal with particular operational conditions, more particularly where considerable loads may occur during "slackening" in operation, for instance, in windlasses. The generator brake valve is controlled via a control line 73 by the pressure $p_1'$ in the forward branch 11a in the zone between the volume regulator 18 and the adjusting motor 15. If the pressure $p_1'$ rises, the generator brake valve 72 is correspondingly opened further. When the pressure $p_1'$ drops, the valve 72 is moved towards a closed position, for instance, by an opposing spring.

Figure 5:
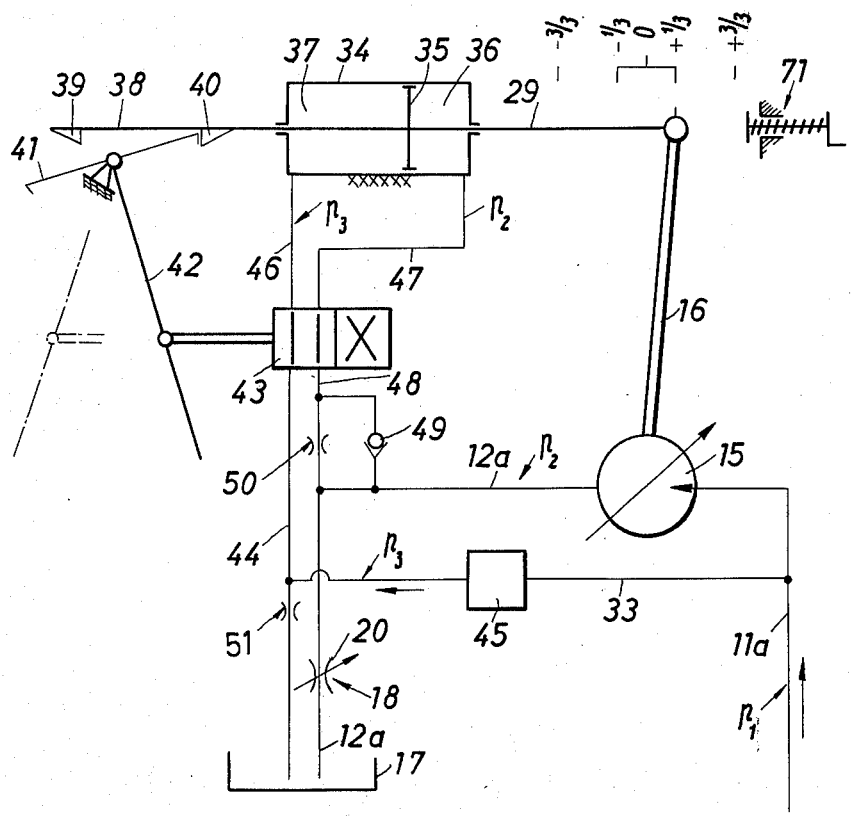
FIG. 5 shows a second embodiment of a control and drive section with a volume regulator disposed in the return line.

The embodiment of the control and drive unit illustrated in FIG. 5 (corresponding curve given in FIG. 6) operates on the same principle as the aforedescribed embodiments. The difference lies in the adjusting members. The unit again has an adjusting motor 15 adjustable via the lever arm 16. For the sake of simplicity, this embodiment and the following ones are described with the volume regulator 18 disposed in the return branch 12a. The adjusting motor 15 is supplied at a constant pressure $p_1$ from the forward branch 11a. In this case also the return branch 12a is shown simplified extending directly to the oil tank 17. A volume regulator 18 is disposed in the return branch 12a, in which a pressure $p_2$ can build up.

To adjust the lever arm 16 of the adjusting motor 15, partly hydraulic adjusting members are provided which operate in dependence on changes in the volume regulator 18. Such a hydraulic adjusting member comprises an adjusting cylinder 34 subdivided by a slidable piston 35 into cylinder chambers 36, 37. The piston is connected to the thrust rod 29 connected to the lever arm 16. The thrust rod 29 has an extension 38 which emerges from the adjusting cylinder 34 on the opposite side and on which two alternately operating stop lugs 39, 40 are disposed. The stop lugs 39 or 40 bear alternately against one end or the other of an adjustable, pivotable stop latch 41 which is pivoted together with a directional valve 43 via an adjusting arm 42.

Each of the two cylinder chambers 36 or 37 (the cylinder chamber 37 in the position illustrated in FIG. 5) experiences a constant pressure $p_3$ which is built up in a separate adjusting line 44 in this embodiment connected to a branch 33 extending from the forward branch 11a, with the interposition of a pressure-reducing valve 45 which maintains the constant pressure $p_3$.

The part of the adjusting line 44 extending to the oil tank 17 contains a throttle 51 which reduces the pressure in the direction of the oil tank 17.

In the position of the directional valve 43 illustrated in FIG. 5, the adjusting line 44 is connected to a cylinder line 46 extending to the cylinder chamber 37. There is therefore a constant pressure $p_3$ in the cylinder chamber 37. The other cylinder chamber 36 is connected via a cylinder line 47 to a feed line 48 extending from the return branch 12a.

When the control unit is in the zero position - i.e., with the volume regulator 18 closed - there is built up on the return branch 12a a pressure $p_2$ which corresponds to the pressure $p_1$ when the adjusting motor 15 is unloaded. This pressure is transmitted via the supply line 48 and cylinder line 47 to the cylinder chamber 36. Since the pressure $p_2$ is greater than the pressure $p_3$, the piston 35 experiences a higher pressure on the side of the cylinder chamber 36. Any corresponding movement beyond the position illustrated is prevented by the stop lug 14 bearing against the correspondingly positioned stop latch.

When the volume regulator 18 is opened, the pressure $p_2$ in the return branch 12a drops, until finally the pressure $p_3$ in the cylinder chamber 37 is greater than the pressure $p_2$. The piston 35 is then moved, so that the lever arm 16 is pivoted out of the position illustrated in the direction of the adjustable stop 71. The movement of the pivoting arm 16 is continued by a corresponding sliding movement of the piston 35, until the adjusting motor 15 has built up an adequate torque corresponding to the loading force. The adjusting motor 15 then begins to run.

As the speed of the adjusting motor increases, a pressure $p_2$ is built up in the return branch 12a upstream of the volume regulator 18. The pressure $p_2$ is transmitted via the supply line 48 and cylinder line 47 to the cylinder chamber 36. Finally, a condition is reached in which there are equal pressures in the cylinder chambers 36 and 37.

The adjusting motor has then reached a position corresponding to the given loading conditions.

When the loading torque on the adjusting motor 15 increases, its speed is reduced. Correspondingly the absorbed volume of the adjusting motor decreases, with the consequence that the pressure $p_2$ in the return branch 12a and therefore in the cylinder chamber 36 drops. As soon as the pressure $p_2$ becomes lower than the pressure $p_3$ in the cylinder chamber 37, the piston 36 experiences a higher pressure on the side adjacent the cylinder chamber 37, so that the lever arm 16 is pivoted further in the direction of the stop 71. As a result the torque of the adjusting motor 15 is increased and its speed increases, until the pressure $p_2$ and the pressure $p_3$ in the cylinder chambers 36, 37 are again in equilibrium. Events occur conversely when the loading torque on the adjusting motor 15 decreases. In that case the speed of the adjusting motor 15 rises and so also does its absorbed volume, so that the pressure $p_2$ is again increased. The piston 35 is moved accordingly so that the lever arm 16 of the adjusting motor is moved further in the direction of the zero position. The resulting reduction in the outward pivoting angle of the swash plate causes a reduction in the motor torque and speed until a pressure equalization $p_2 = p_3$ has again been reached in the adjusting cylinder 34.

To prevent the motor from overspeeding in the zone of the zero position, the stop lugs 39, 40 and the stop latch 41 are so adapted to one another that there is always a slight outward pivoting angle of the swash plate of the adjusting motor 15, and therefore a certain pivoting position of the lever arm 16. In the embodiment illustrated this minimum outward pivoting angle of the adjusting motor 15 is so selected as to be one-third of the maximum outward pivoting angle. If the loading torque drops below a value corresponding to such minimum end position of the adjusting motor 15, the adjusting cylinder 34 becomes inoperative, since the thrust rod 29 is retained by the stop lug 40 bearing against the stop latch 41. In this operational zone a rising pressure $p_2$ builds up in the return branch 12a and reduces the pressure gradient $p_1$ minus $p_2$ on the adjusting motor 15.

This zone — i.e., the one of low loading torques, which are smaller than one-third of the maximum loading torque — is therefore operated with throttle control, the volume regulator 18 acting as the throttle. However, in practice operations are only rarely performed in this zone.

The graph (FIG. 6) shows the characteristic of the adjusting motor 15 with the control and drive unit illustrated in FIG. 5. The hatched area corresponds to throttling operation - i.e., in which the loading torque is 33% of the maximum. The output lines 49a–49d shows the output of the motor with the volume regulator completely open (49a), with the volume regulator 75% opened (49b), with the volume regulator 50% opened (49c), and with the volume regulator 25% opened (49d).

In this control and drive unit the directional valve 43 determines the direction of rotation of the adjusting motor 15. By the adjustment of the directional valve 43 to the other position the cylinder chamber 36 experiences the constant pressure $p_3$. The extension 38 of the thrust rod 29 then comes into engagement in one end position (corresponding to 33% of the maximum torque) with the stop lug 39 at the other end of the stop latch 41 which has been adjusted together with the directional valve 43.

To prevent the lever arm 16 of the adjusting motor 15 from being pivoted too quickly in the direction of a larger adjusting angle, the supply line 48 incorporates a damping device comprising a non-return valve 49 and a throttle 50. The result of the damping is that the lever arm 16 can pivot quickly in the direction of a reduction in the adjusting angle.

Figure 7:
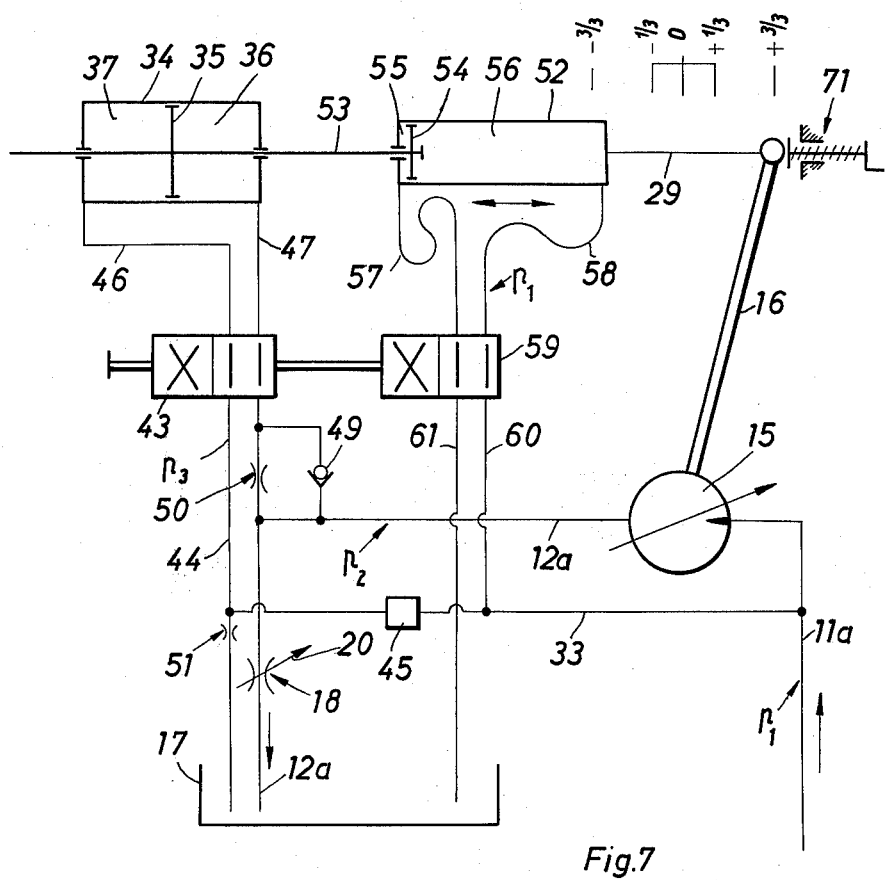
FIG. 7 shows a third embodiment of a control and drive section with a volume regulator disposed in the return line.

The control and drive unit illustrated in FIG. 7 operates in principle in the same manner as that illustrated in FIG. 5. Hydraulic devices are substituted for the mechanical stops 39–41. To this end a limiting cylinder 52 is provided which in this embodiment is disposed between the thrust rod 29 and the adjusting cylinder 34 and is rigidly connected to the thrust rod 29.

Disposed between the limiting cylinder 52 and the adjusting cylinder 34 is an intermediate rod 53 which is connected to the piston 35 of the adjusting cylinder 34 and to a piston 54 in the limiting cylinder 52. The piston 54 subdivides the limiting cylinder 52 into cylinder chambers 55, 56. Extending to the cylinder chambers 55, 56 are lines 57, 58 which are at least partly flexible, so that they can follow the movements of the limiting cylinder 52. The lines 57, 58 can be connected alternately via a directional valve 59 to a supply line 60 and a discharge line 61. The former always experiences a pressure $p_1$ from the network and is to this end connected to the branch 33 extending from the forward branch 11a. The discharge line 61 extends to the oil tank 17.

In the position of the directional valve 59 indicated the cylinder chamber 56 experiences the pressure $p_1$, while the cylinder chamber 55 is unpressurized. The result is the illustrated end position of the piston 54.

The illustrated position of the unit corresponds to the maximum adjustment of the swash plate of the adjusting motor 15. The piston 35 of the adjusting cylinder 34 is disposed during this phase in a central position in which equal pressures $p_2$, $p_3$ prevail in the cylinder chambers 36, 37.

If in this position the loading torque on the adjusting motor 15 is reduced, the pressure $p_2$ is raised due to a higher speed. As a result the piston 35 in the adjusting cylinder 34 is so actuated that a movement of the piston 35 to the left (referred to FIG. 7) takes place. The movement of the piston 35 can at most continue until abutment with the cylinder wall of the adjusting cylinder 34. This maximum travel of the piston 35 from the illustrated central position corresponds to the pivoting travel of the lever arm 16 from the illustrated position into the position corresponding to the least possible pivoting of the swash plate (in this case for instance 33% of the maximum outward pivoting). The limiting cylinder 52 merely accompanies this movement of the piston 35 and thrust rod 29, but there is no change in the relative position of the piston 54.

When the direction of rotation of the adjusting motor 15 is reversed, the directional valve 43 is actuated. At the same time, namely jointly therewith, the directional valve 59 associated with the limiting cylinder 52 is adjusted. In the limiting cylinder 52 the cylinder chamber 55 then experiences the pressure $p_1$. As a result the piston 54 moves into the opposite end position, so that the possible end positions of the lever arm 16 are displaced into the zone corresponding to the particular direction of rotation.

In this case the adjusting cylinder 34 operates similarly.

Figure 6:
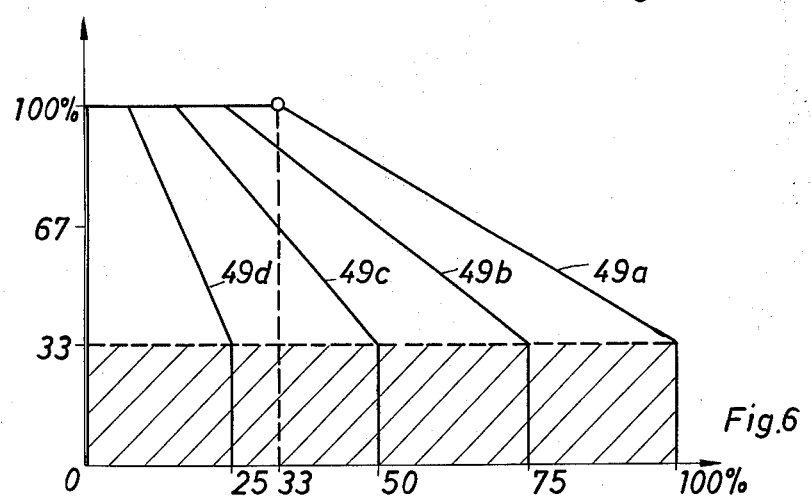
FIG. 6 shows a graph of the installation illustrated in FIGS. 5 and 7.

A motor characteristic as shown in FIG. 6 also corresponds to the control and drive unit illustrated in FIG. 7.

Figure 8:
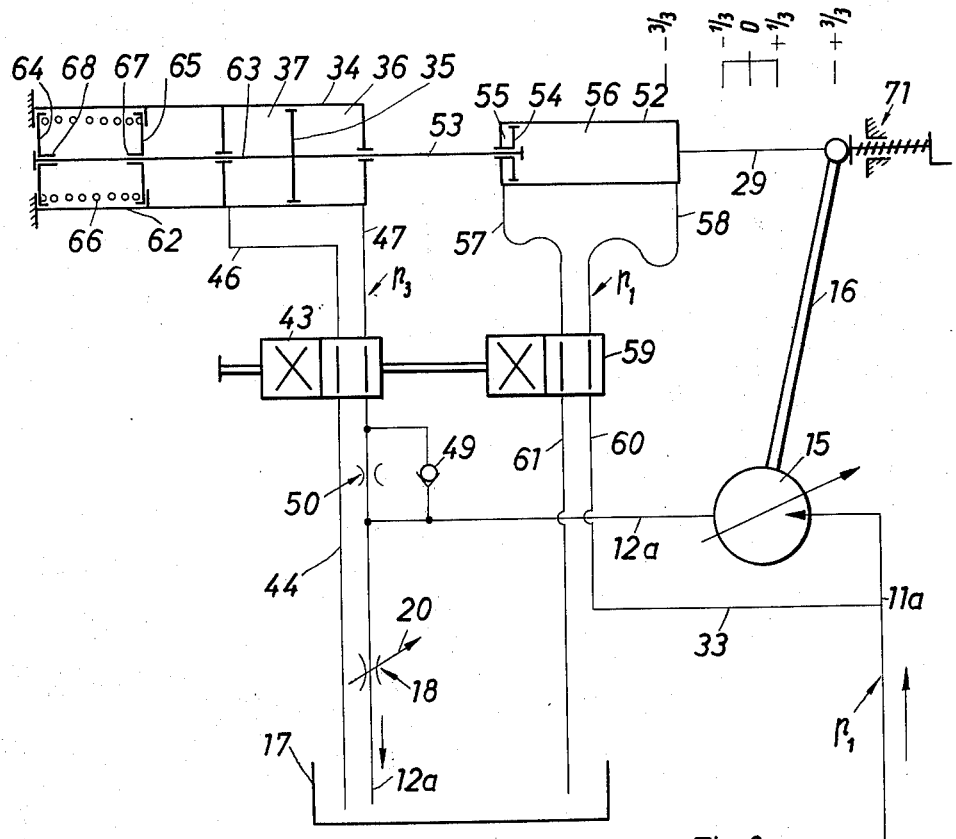
FIG. 8 shows a fourth embodiment of a control and drive action with a volume regulator disposed in the return line.
Figure 9:
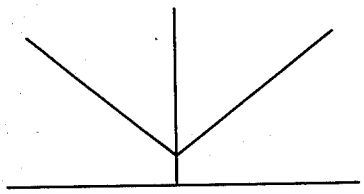
FIG. 9 shows a diagram of the curve of a spring used in the installation illustrated in FIG. 8.

The embodiment illustrated in FIG. 8 is based on the control and drive unit illustrated in FIGS. 5 and 7. The stop for determining the maximum adjusting angle of the adjusting motor 15 is constructed as in FIG. 7. One difference from the preceding embodiments is the method of actuating the adjusting cylinder 34. There is no device for producing the counter pressure $p_3$. Instead, the adjusting cylinder 34 is extended, namely it has a spring cylinder 62 in which the extended piston rod 63 of the piston 35 bears via a mutually operative spring washer 64, 65 against a compression spring 66. FIG. 9 shows the characteristic of the compression spring 66. In the position illustrated, corresponding to the maximum pivoted angle of the lever arm 16, there is equilibrium between the pressure $p_2$ in the cylinder chamber 36 of the adjusting cylinder 34 on the one hand, and the prestressing of the compression spring 66 on the other. When the loading torque on the adjusting motor 15 decreases, its speed increases. The pressure $p_2$ is raised and causes a displacement of the piston 35, accompanied by the compression of the spring 66. The movement continues until there is equilibrium between the compression spring 66 and the pressure $p_2$ or until an end position is reached which in this case (as in the preceding embodiments) corresponds to 33% of the maximum adjusting angle of the motor 15. This end position can be reached, for instance, by the impingement on one another of stops 67, 68, of the spring washers 64, 65.

When the direction of rotation is reversed by the actuation of the directional valve 43, the result is conversely similar operation of the adjusting cylinder 34. The spring washer 64 acts on the spring 66 via the extended piston rod 63.

The control and drive unit illustrated in FIG. 8 differs from that illustrated in FIGS. 5 and 7 by the feature that the pressure in the zone of the adjusting cylinder 34 counteracting the pressure $p_2$ has a special characteristic, namely that of the prestressed compression spring 66. This characteristic is shown in FIG. 9.

Figure 10:
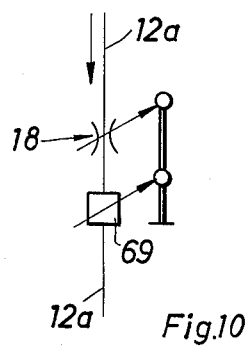
FIG. 10 shows a detail view of the installation illustrated.
Figure 11:
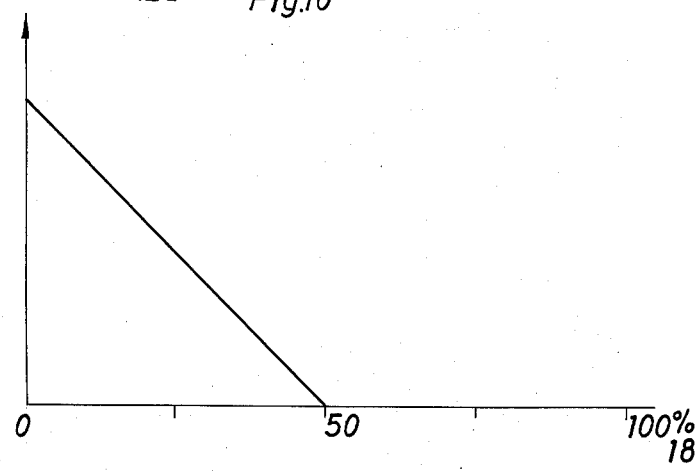
FIG. 11 shows a curve of the apparatus illustrated in FIG. 10.
Figure 12:
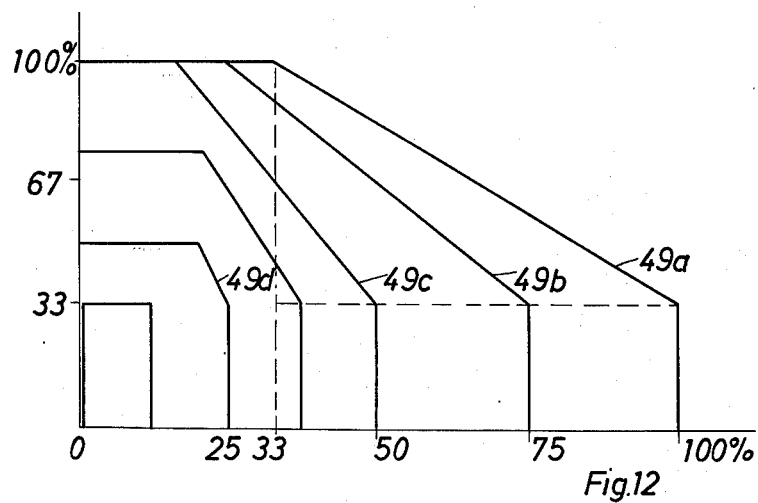
FIG. 12 shows a graph of the characteristic of an installation as illustrated in FIG. 10.

The control and drive unit illustrated in FIG. 8, namely the construction with a compression spring 66, allows a special extra device, the effects being shown in FIGS. 10–12. This is a pressure counterbalance valve 69 in the return branch 12a extending to the oil tank 17. As shown by FIG. 10, the pressure counterbalance valve is connected downstream of the volume regulator 18 and adjusted jointly therewith. The pressure counterbalance valve 69 can be a commercially available pressure-limiting valve, the pressure level being adjusted in dependence on the volume regulator 18.

The graph (FIG. 11) shows the characteristic of the pressure counterbalance valve 69 in conjunction with the volume regulator 18. The pressure counterbalance valve 69 therefore operates only in the bottom opening zone of the volume controller 18.

This extra device, namely the pressure counterbalance valve 69, ensures that the torque does not rise to 100% in the lower zone of motor speeds. The pressure counterbalance valve 69 raises the pressure $p_2$ in the return branch 12a in the range of effect shown in FIG. 11, namely with the volume regulator 18 partly opened. The pressure $p_2$, which is therefore higher than the pressure $p_2$ normally set up, causes a further displacement of the piston 35 in such a direction that the spring 66 is further compressed and the lever arm 16 even further pivoted in the direction of the zero position. The result is a characteristic of the adjusting motor 15 shown in FIG. 12. It can be gathered that when the volume regulator 18 is open to less than 50%, it is impossible to reach the maximum torque of the adjusting motor 15. The greatest torque in this phase of operation is lower than the maximum torque, in dependence on the opening position of the volume regulator 18. The smaller the opening of the volume regulator 18, the lower the maximum torque which can be reached with this particular opening position.

Conveniently, the control and drive units described have a hydraulic power booster (not shown) which transmits the travel pulses occurring at the thrust rod 29 in the form of adjusting forces to the lever arm 16 for the pivoting thereof. The power booster (not shown) is therefore disposed in the zone of the thrust rod 29. Suitable hydraulic power boosters are commercially available.

What is claimed is:

1. A hydraulic system comprising:
   a. a main pump for pumping hydraulic fluid;
   b. a main supply line and a main return line connected to said pump to form a main hydraulic circuit;
   c. means to drive said main pump so as to maintain a constant pressure within said main hydraulic circuit;
   d. a plurality of variable volume hydraulic adjusting motors, each driving a device, such as warping or retaining winches;
   e. branch line means connecting each of the variable volume hydraulic adjusting motors in parallel to said main supply line and said main return line;
   f. an adjustable volume regulator disposed in the branch line means of each variable volume adjusting motor to regulate the volume of hydraulic fluid used by said motors;
   g. means to adjust the torque of each of said variable volume hydraulic adjusting motors; and
   h. means to control the torque adjusting means and the adjustable volume regulator of each motor in dependence on one another.

2. The improved hydraulic system of claim 1 wherein said adjustable volume regulator is disposed in the branch line means connecting said main supply line to said variable volume hydraulic adjusting motor.

3. The improved hydraulic system of claim 2 wherein a variable valve is disposed in a line connecting said outlet of said hydraulic adjusting motor to said main return line.

4. The improved hydraulic system of claim 3 wherein the position of said variable valve is controlled by the pressure between said adjustable volume regulator and said hydraulic adjusting motor.

5. The improved hydraulic system of claim 4 wherein said means to control said torque adjusting means and said adjustable volume regulator comprises
   a. a manually rotatable shaft,
   b. a crank arm affixed to one end of said shaft,
   c. a necgabucak kubjage cibbectubg said crank arm with said torque adjusting means,
   d. a cam attached to said rotatable shaft, and
   e. cam follower means engaging said cam and connected to said adjustable volume regulator.

6. The improved hydraulic system of claim 1 wherein said adjustable volume regulator is disposed in the branch line means connecting said hydraulic adjusting motor to said main hydraulic return line.

7. The improved hydraulic system of claim 6 wherein controllable means interconnect said adjustable volume regulator and said torque adjusting means.

8. The improved hydraulic system of claim 7 wherein said controllable interconnecting means comprises:
   a. a manually rotatable shaft, having a crank arm at one end,
   b. mechanical linkage connecting said crank arm with said torque adjusting means,
   c. a cam attached to said rotatable shaft, and
   d. cam follower means engaging said cam and connected to said adjustable volume regulator.

9. The improved hydraulic system of claim 8 wherein said cam is positioned such that said torque adjusting means is moved before the volume regulator is opened.

10. The improved hydraulic system of claim 8 wherein said cam is positioned such that said volume regulator reaches its full open position before said torque adjusting means reached its maximum torque position.

11. The improved hydraulic system of claim 10 wherein said volume regulator reaches its fully open position when said torque adjusting means reaches one-third of its maximum position.

12. The improved hydraulic system of claim 7 wherein said controllable interconnecting means comprise:
   a. an hydraulic adjusting cylinder having a piston rod connected to said torque adjusting means;
   b. a two position, directional control valve having a first inlet and outlet and a second inlet and outlet,
   c. first conduit means connecting said first outlet and said second inlet to said hydraulic adjusting cylinder,
   d. second conduit means connecting said first inlet with said variable volume hydraulic adjusting motor upstream of said adjustable volume regulator,
   e. third conduit means connecting said second outlet to a receiving tank, and
   f. a pressure reducing valve operatively connected between the variable volume hydraulic adjusting motor supply line and said third conduit means.

13. The improved hydraulic system of claim 12 wherein said controllable interconnecting means further comprises:
   a. an hydraulic limiting cylinder having its piston rod connected to said hydraulic adjusting cylinder piston rod, the outer cylinder of said hydraulic limiting cylinder being mechanically connected to said torque adjusting means,
   b. a second two position directional control valve mechanically connected to said first two position directional control valve,
   c. fourth conduit means interconnecting said second two position directional control valve with said hydraulic limiting cylinder, and
   d. fifth conduit means interconnecting said second two position directional control valve with said variable volume hydraulic adjusting motor supply line and a receiving tank, respectively.

14. The improved hydraulic system of claim 12 wherein throttle means are located in said second and third conduit means.

15. The improved hydraulic system of claim 12 wherein the movement of said hydraulic adjusting cylinder piston is limited by movable stop means.

16. The improved hydraulic system of claim 13 wherein said hydraulic adjusting cylinder piston is spring loaded to a central position with said cylinder.

17. The improved hydraulic system of claim 16 wherein a second piston rod attached to said piston is connected to a washer, said washer engaging one end of said spring attached to a stationary structure.

18. The improved hydraulic system of claim 5 wherein said cam is positioned such that said torque adjusting means is moved before the adjustable volume regulator is opened.

19. The improved hydraulic system of claim 5, wherein said cam is positioned such that said adjustable volume regulator reaches its full open position before said torque adjusting means reaches its maximum torque position.

20. The improved hydraulic system of claim 19, wherein said adjustable volume regulator reaches its fully open position when said torque adjusting means reaches one-third of its maximum position.

* * * * *